US009530166B2

(12) United States Patent
Taylor et al.

(10) Patent No.: US 9,530,166 B2
(45) Date of Patent: Dec. 27, 2016

(54) SOCIAL GRAPH THAT INCLUDES WEB PAGES OUTSIDE OF A SOCIAL NETWORKING SYSTEM

(75) Inventors: Bret Steven Taylor, Los Gatos, CA (US); Michael Steven Vernal, San Francisco, CA (US); Gerald Richard Cain, San Francisco, CA (US); Mark William Kinsey, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 1639 days.

(21) Appl. No.: 12/764,929

(22) Filed: Apr. 21, 2010

(65) Prior Publication Data
US 2011/0265011 A1 Oct. 27, 2011

(51) Int. Cl.
*G06Q 50/00* (2012.01)
*H04L 29/08* (2006.01)
(Continued)

(52) U.S. Cl.
CPC ............ *G06Q 50/01* (2013.01); *G06F 9/542* (2013.01); *G06F 17/30598* (2013.01); *G06F 17/30861* (2013.01); *G06F 17/30867* (2013.01); *H04L 12/588* (2013.01); *H04L 51/32* (2013.01); *H04L 67/02* (2013.01); *H04L 67/146* (2013.01); *H04L 67/22* (2013.01)

(58) Field of Classification Search
USPC 705/319, 26.1, 27.1, 14.66, 14.49; 455/518, 455/519; 715/751, 733, 838, 760
See application file for complete search history.

(56) References Cited

U.S. PATENT DOCUMENTS 5,848,396 A * 12/1998 Gerace .......................... 705/7.33
6,269,343 B1 * 7/2001 Pallakoff ...................... 705/26.2
(Continued)

FOREIGN PATENT DOCUMENTS

CN 101645926 A 2/2010
JP 2009-211211 A 9/2009
(Continued)

OTHER PUBLICATIONS

PCT International Search Report and Written Opinion, PCT Application No. PCT/US2011/032564, Jun. 13, 2011, eight pages.
(Continued)

*Primary Examiner* — Jeffrey A Gaffin
*Assistant Examiner* — John M Heffington
(74) *Attorney, Agent, or Firm* — Fenwick & West LLP

(57) ABSTRACT

A social networking system includes a mechanism for incorporating nodes in the social graph, where the nodes are associated with a web page. Each web page includes one or more tags, which contain meta-information for defining the node in the social networking system, such as the type of the node. The social networking system retrieves the tags from the markup language document and stores their information in connection with the node for the web page. The web page may be outside of the social networking system's domain and may be operated by an entity other than the social networking operator; thus, third parties can define, create, and maintain nodes that are then used by the social networking system. Users may then interact with the nodes on websites outside of the social networking system, and these interactions are tracked by and reflected back within the social networking system.

23 Claims, 4 Drawing Sheets

(51) Int. Cl.
  *G06F 17/30* (2006.01)
  *H04L 12/58* (2006.01)
  *G06F 9/54* (2006.01)

(56) References Cited

U.S. PATENT DOCUMENTS

| | | | |
|---|---|---|---|
| 7,752,552 B2* | 7/2010 | Pennington et al. | 715/751 |
| 7,752,553 B2* | 7/2010 | Pennington et al. | 715/751 |
| 7,778,884 B2* | 8/2010 | Bamborough et al. | 705/14.36 |
| 7,844,604 B2* | 11/2010 | Baio et al. | 707/732 |
| 7,860,751 B2* | 12/2010 | Mangalick et al. | 705/26.41 |
| 8,316,450 B2* | 11/2012 | Robinson et al. | 726/26 |
| 2001/0054067 A1* | 12/2001 | Miller et al. | 709/203 |
| 2003/0163375 A1* | 8/2003 | Dombrowski et al. | 705/14 |
| 2004/0002878 A1* | 1/2004 | Maria Hinton | 705/7 |
| 2004/0128393 A1* | 7/2004 | Blakley et al. | 709/229 |
| 2004/0148275 A1* | 7/2004 | Achlioptas | 707/3 |
| 2005/0154639 A1* | 7/2005 | Zetmeir | 705/14 |
| 2006/0004892 A1 | 1/2006 | Lunt et al. | |
| 2006/0080613 A1* | 4/2006 | Savant | 715/745 |
| 2006/0190281 A1* | 8/2006 | Kott et al. | 705/1 |
| 2006/0242581 A1* | 10/2006 | Manion et al. | 715/733 |
| 2007/0106627 A1* | 5/2007 | Srivastava et al. | 706/20 |
| 2007/0300064 A1* | 12/2007 | Isaacs et al. | 713/168 |
| 2008/0046562 A1* | 2/2008 | Butler | 709/224 |
| 2008/0126476 A1* | 5/2008 | Nicholas et al. | 709/203 |
| 2008/0134035 A1* | 6/2008 | Pennington et al. | 715/713 |
| 2008/0228537 A1* | 9/2008 | Monfried et al. | 705/7 |
| 2008/0307085 A1* | 12/2008 | Curran et al. | 709/223 |
| 2009/0182589 A1* | 7/2009 | Kendall et al. | 705/5 |
| 2009/0222348 A1* | 9/2009 | Ransom et al. | 705/14 |
| 2009/0271247 A1 | 10/2009 | Karelin et al. | |
| 2009/0282110 A1 | 11/2009 | Price et al. | |
| 2010/0057859 A1* | 3/2010 | Shen et al. | 709/206 |
| 2010/0217645 A1* | 8/2010 | Jin et al. | 705/9 |
| 2010/0268582 A1* | 10/2010 | Tanaka | 705/14.4 |
| 2011/0145698 A1* | 6/2011 | Penov et al. | 715/235 |
| 2011/0153377 A1* | 6/2011 | Novikov et al. | 705/7.11 |
| 2011/0153412 A1* | 6/2011 | Novikov et al. | 705/14.42 |
| 2011/0231240 A1* | 9/2011 | Schoen et al. | 705/14.41 |
| 2012/0084160 A1* | 4/2012 | Badros et al. | 705/14.73 |

FOREIGN PATENT DOCUMENTS

| | | |
|---|---|---|
| JP | 2010-039564 A | 2/2010 |
| JP | 2010-039845 A | 2/2010 |
| JP | 2010-061635 A | 3/2010 |
| JP | 2011-504260 A | 2/2011 |
| WO | WO 2009/061617 A | 5/2009 |

OTHER PUBLICATIONS

Australian Government, IP Australia, Patent Examination Report No. 1, Patent Application No. 2011243008, Aug. 9, 2013, three pages.

Australian Government, IP Australia, Patent Examination Report No. 2, Patent Application No. 2011243008, Nov. 15, 2013, three pages.

Canadian Intellectual Property Office , Office Action, Canadian Patent Application No. 2,794,412, Oct. 8, 2014, four pages.

Canadian Intellectual Property Office , Office Action, Canadian Patent Application No. 2,794,412, Sep. 18, 2015, five pages.

Japan Patent Office, Office Action, Japanese Patent Application No. 2013-506187, Mar. 10, 2015, six pages.

State Intellectual Property Office of the People's Republic of China, First Office Action, Chinese Patent Application No. 201180020125.5, Aug. 20, 2014, forty-seven pages.

State Intellectual Property Office of the People's Republic of China, Second Office Action, Chinese Patent Application No. 201180020125.5, Apr. 16, 2015, six pages.

State Intellectual Property Office of the People's Republic of China, Third Office Action, Chinese Patent Application No. 201180020125.5, Nov. 16, 2015, four pages.

\* cited by examiner

SOCIAL GRAPH THAT INCLUDES WEB PAGES OUTSIDE OF A SOCIAL NETWORKING SYSTEM

BACKGROUND

This invention relates generally to social networking, and in particular to a social networking environment in which a social graph may include web pages outside of a social networking system.

Social networking systems have become prevalent in recent years because they provide a useful environment in which users can connect to and communicate with other users. Although a variety of different types of social networking systems exist, these systems commonly provide mechanisms allowing users to define and interact within their social networks. In this context, a user may be an individual or any other entity, such as a business or other non-person entity. Accordingly, while enabling social communications among friends, a social networking system can also be a valuable tool for businesses to engage with potential consumers. Even without a commercial purpose, a social networking system may allow other types of entities to spread their message. For example, a non-person entity may set up a page or group that other users can join (or become a "fan" of), which enables the non-person entity to provide a forum to receive and transmit communications to a group of interested users.

The useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content items, groups, events, messages, concepts, and any other things that can be represented by an object in a social networking system. An edge between two nodes in the social graph represents a particular kind of connection between the two nodes, which may result from an action that was performed by one of the nodes on the other node.

For example, if one user establishes a connection with another user in the social networking system, the two users are represented as a node, and the edge between them represents the established connection. Continuing this example, one of these users may send a message to the other user within the social networking system. This act of sending the message is another edge between those two nodes, which can be tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the attendance of the event is the edge. Using a social graph, therefore, a social networking system may keep track of many different types of objects and the interactions and connections among those objects, thereby maintaining an extremely rich store of socially relevant information.

One limitation of a social networking system's ability to track socially relevant information is the ability to represent different objects and to track any interactions among them. This problem can be appreciated in the context of the discussion of the social graph. If something is not represented by a node in the first place, then other nodes cannot interact with it such that the social networking system can track an edge between those nodes. For example, if it were desirable to track whether a user purchased a product outside of the social networking system, the information necessary to track that product as a node would have to be provided to the social networking system. However, there is no efficient mechanism to provide this information so that it can be used effectively by the social networking system. Accordingly, what are needed are mechanisms to facilitate expansion of the social graph to allow a social networking system to track socially relevant information for a wide variety of things.

SUMMARY

To enable a social networking system to track socially relevant information about objects and their interactions, embodiments of the invention provide a flexible mechanism for incorporating nodes in the social graph. In particular, embodiments of the invention enable a node to be defined by an association with a web page (or anything represented by a URL, URI, or any other address on the Internet or other network), which may be outside of the domain of the social networking system. Since anything can be represented by a web page, and web pages may be easily created to represent any person, place, or other thing, this effectively expands the social graph across any arbitrary place on the Internet.

In one embodiment, a web page is associated with a node in a social networking system. The web page is encoded by a markup language document, which a web browser application can use to render and display the web page on a user device. The markup language document includes one or more tags, which contain meta-information about the node. The tags may provide textual titles, labels, an identifier unique to the node, a micro format, and/or descriptions about the node, as well as other information, such as the type of the node. The social networking system retrieves the tags from the markup language document and stores their information in connection with the node for the web page. In this way, a node in the social networking system may be created and defined based on the information contained within a web page. The web page may be outside of the social networking system's domain and may be operated by an entity other than the social networking operator; thus, third parties can define, create, and maintain nodes that are then used by the social networking system. This effectively opens the social graph to third-party developers and encourages further development and definition of a complex and rich social graph.

In use, in one embodiment, a user device requests a web page from a website server, which may be outside of and separate from the social networking system. The server sends to the user device a markup language document that includes an instruction for a browser application running on the user device to incorporate within the web page information obtained from the social networking system. In one embodiment, the instruction creates a frame within the web page that contains content pulled directly from the social networking system (e.g., an iframe). The content of the frame, provided by the social networking system, contains an action button that enables a user to interact with the node. This action may depend on the type of node, such as becoming a fan or liking of a fan page node, joining a group or interest associated with the node, submitting a review associated with the node, connecting with the node, sharing the node with another user, confirming attendance to an event node, checking in to a location node, commenting on a media item node, just to name a few examples. The frame may also contain social information that is relevant to the user and the node, such as an indication of one or more of the user's connections in the social networking system who have also performed the action.

Since the frame is a direct interface with the social networking system, the user may select the action button to perform the action just as when the user is normally on the social networking system. The external website need not know that the action was taken, or even the identity of the user. Once the action is taken by the user, the social networking system can react just as if the user were interacting with node within the social networking system. For example, the social networking system can update the user's profile to add an association with the node, post the action to the user's connections, and/or any combination of responses that are appropriate when a user interacts with a node in the social networking system.

Accordingly, embodiments of the invention allow the social graph used by the social networking system to include anything that can be represented by a web page. This also enables users to interact easily with nodes in the social graph outside of the domain of the social networking system. Finally, this allows for a user's interactions with a node that represents a web page to be propagated back to the social networking system, which may then use the resulting socially relevant information for various purposes (e.g., posting activity feeds, targeting advertising, etc.).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1:
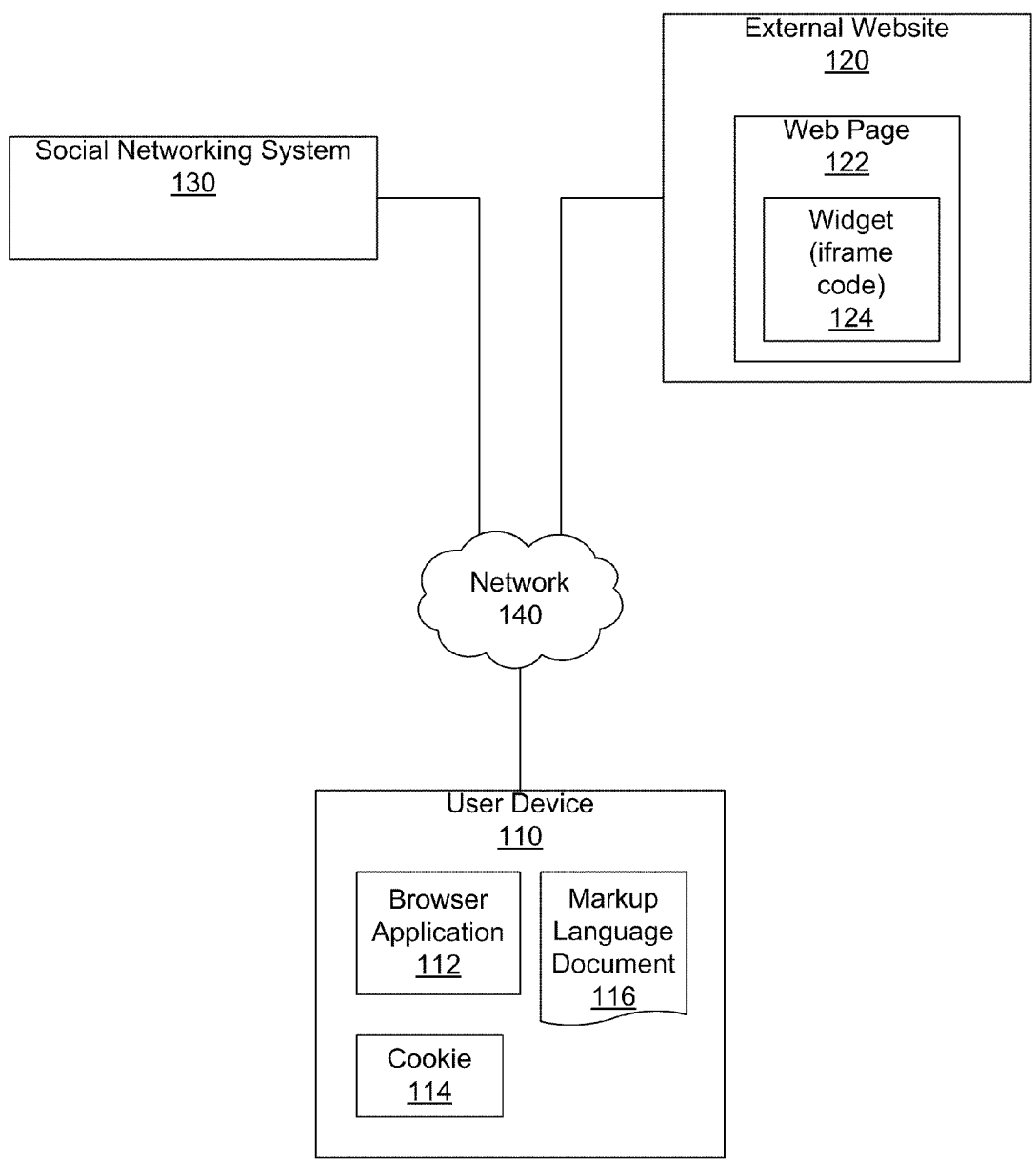
FIG. 1 is a network diagram of a system for providing personalized content to a user of a social networking system, in accordance with an embodiment of the invention.

FIG. 1 is a network diagram of one embodiment of a system 100 for providing personalized content to a user of a social networking system 130. The system 100 includes one or more user devices 110, one or more external websites 120, the social networking system 130 and a website 140. For purposes of illustration, the embodiment of the system 100 shown by FIG. 1 includes a single external website 120 and a single user device 110. However, in other embodiments, the system 100 may include more user devices 110 and/or more external websites 120. In certain embodiments, the social networking system 130 is operated by the social network provider, whereas the external websites 120 are separate from the social networking system 130 in that they may be operated by different entities. In various embodiments, however, the social networking system 130 and the external websites 120 operate in conjunction to provide social networking services to users of the social networking system 130. In this sense, the social networking system 130 provides a platform, or backbone, which other systems, such as external websites 120, may use to provide social networking services and functionalities to users across the Internet.

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the external website 120 and the social networking system 130 via the network 140, which may comprise any combination of local area and/or wide area networks, using both wired and wireless communication systems.

In one embodiment, the user device 110 displays content from the external website 120 or from the social networking system 130 by processing a markup language document 116 received from the external website 120 or from the social networking system 130 using a browser application 120. The markup language document 116 identifies content and one or more instructions describing formatting or presentation of the content. By executing the instructions included in the markup language document 116, the browser application 112 displays the identified content using the format or presentation described by the markup language document 116. For example, the markup language document 116 includes instructions for generating and displaying a web page having multiple frames that include text and/or image data retrieved from the external website 120 and/or the social networking system 130. In various embodiments, the markup language document 116 comprises a data file including extensible markup language (XML) data, extensible hypertext markup language (XHTML) data or other markup language data.

In one embodiment, the user device 110 also includes a cookie 114 including data indicating whether a user of the user device 110 is logged into the social networking system 130. The cookie 114 indicates whether the user of the computing device 110 is involved in an active session where the user device 110 exchanges data with the social networking system 130, allowing modification of the data communicated from the social networking system 130 to the user device 110. Use of the cookie 114 in exchanging data between the user device 110, the social networking system 130 and/or the external website 120 is further described below in conjunction with FIG. 5.

The external website 120 comprises one or more web servers including one or more web pages 122, which are communicated to the user device 110 using the network 140. The external website 120 is separate from the social networking system 130. For example, the external website 120 is associated with a first domain while the social networking website is associated with a separate social networking domain. A web page 122 included in the external website 120 comprises a markup language document identifying content and including instructions specifying formatting or presentation of the identified content, as described above.

The markup language document 116 includes one or more tags including meta-information associating the web page 122 represented by the markup language document 116 with a node in the social networking system 130, which are further described below. The tags may provide textual titles, labels, and/or descriptions about the node in the social networking system 130, as well as other information, such as a title, label, unique identifier, micro format, and/or descriptions about the node, as well as other information, such as the type of the node. The tags allow creation of a node in the social networking system 116 based on the information within the markup language document 116 comprising a web page 122. As the web page 122 may be maintained by an external website 120 that is outside of the domain of the social networking system 130 and may be operated by an entity other than an operator of the social networking system 130, the tags in the markup language document 116 allow external websites 120 to define, create, and maintain nodes used by the social networking system 130, as further described below.

In one embodiment, a web page 122 includes a widget 124 comprising instructions that, when executed by a browser application 112 of a user device 110, retrieve data from the social networking system 130 and display the information retrieved from the social networking system 130. For example, the widget 124 comprises an instruction associated with the social networking system 130 that generates a frame within the web page 122 that includes information from the social networking system 130. Hence, the widget 124 allows a web page 122 from the external website 120 to provide personalized content from the social networking website 130 when the web page 122 is rendered and displayed by a browser application 112 of a user device 110. The widget 124 also allows a user to interact with content from the social networking website 130 by interacting with content in the frame generated within the web page 122.

The social networking system 130 comprises one or more computing devices storing a social network, or a social graph, comprising a plurality of users and providing users of the social network with the ability to communicate and interact with other users of the social network. The social networking system 130 is further described below in conjunction with FIG. 2. In use, users join the social networking system 130 and then add connections to a number of other users of the social networking system 130 to whom they desire to be connected. As used herein, the term "friend" refers to any other user of the social networking system 130 to whom a user has formed a connection, association, or relationship via the social networking system 130.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking system 130 or in an external website 120, separate from the social networking system 130, coupled to the social networking system 130 via a network 140.

The social networking system 130 is also capable of linking a variety of entities. For example, the social networking system 130 enables users to interact with each other as well as external websites 120 or other entities through an API or other communication channels. Thus, the social networking system 130 generates and maintains a "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, events, messages, concepts, and any other things that can be represented by an object in the social networking system 130. An edge between two nodes in the social graph represents a particular kind of connection between the two nodes, which may result from an action that was performed by one of the nodes on the other node. For example, when a first user identifies a second user as a friend, an edge in the social graph is generated connecting a node representing the first user and a second node representing the second user. As various nodes interact with each other, the social networking system 130 modifies edges connecting the various nodes to reflect the interactions.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 100. Posts may include data such as status updates or other textual data, location information, photos, videos, links, music or other similar data and/or media. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact with the social networking system 130.

Figure 2:
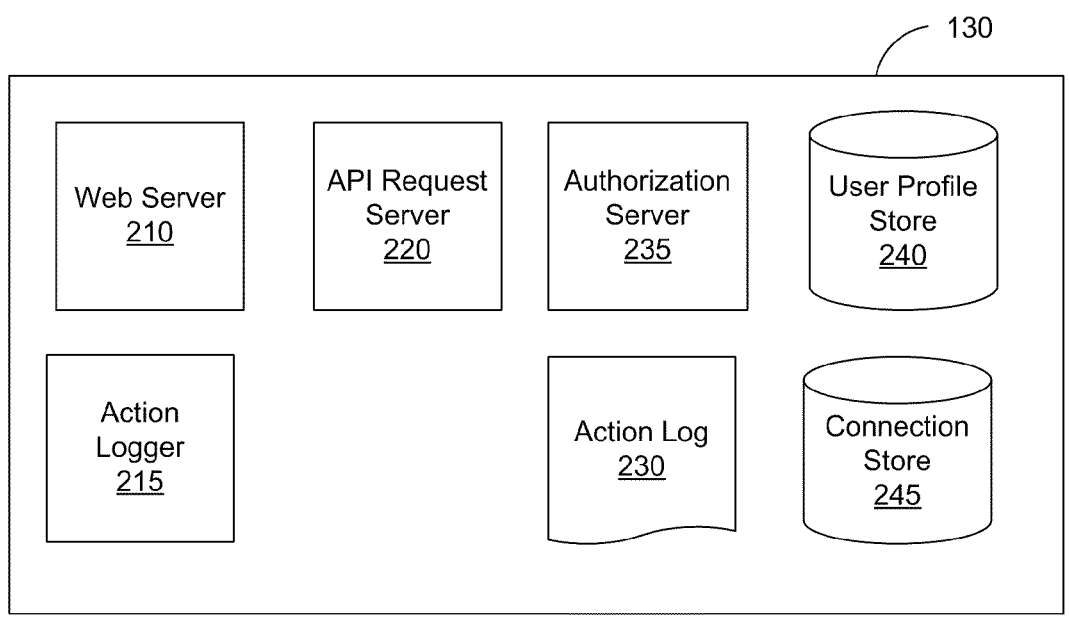
FIG. 2 is a diagram of a social networking system, in accordance with an embodiment of the invention.

FIG. 2 is a diagram of one embodiment of a social networking system 130. The embodiment of a social networking website 130 shown by FIG. 2 includes a web server 210, an action logger 215, an API request server 220, an action log 230, a user profile store 240, and a connection store 245. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network. The user profiles include biographic, demographic, and other types of descriptive information, such as work experience, educational history, hobbies or preferences, location, and the like. The social networking system 130 further stores data describing one or more connections between different users in the connection store 245. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

The web server 210 links the social networking system to one or more user device 110 and/or one or more external websites 130 via the network 240. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The Application Programming Interface (API) request server 220 allows one or more external websites 120 to access information from the social networking system 130 by calling one or more APIs. The API request server 220 may also allow external websites 120 to send information to social networking website by calling APIs. For example, an external website 120 sends an API request to the social networking system 130 via the network 140 and the API request server 220 receives the API request. The API request server 220 processes the request by calling an API associated with the API request to generate an appropriate response, which the API request server 220 communicates to the external website 120 via the network 140. For example, responsive to an API request, the API request server 220 collects data associated with a user and communicates the collected data to the external website 120.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in an action log 240. In one embodiment, the social networking system maintains the action log 230 as a database of entries. When an action is taken within the social networking system 130, an entry for the action is added to the action log 230.

Additionally, user actions may be associated with an entity outside of the social networking system 130, such as an external website 120 that is separate from the social networking system 130. For example, the action logger 215 receives data describing a user's interaction with an external website 120 from the web server 210. Examples of actions where a user interacts with an external website 120 include a user expressing an interest in an external website 120 or another entity, a user posting a comment to the social networking system 130 that discusses an external website 120 or a web page 122 within the external website 120, a user posting to the social networking system 130 a Uniform Resource Locator (URL) or other identifier associated with an external website 120, a user attending an event associated with an external website 120 or any other action by a user that is related to an external website 120. Thus, the action log 240 may include actions describing interactions between a social networking system 130 user and an external website 120 that is separate from the social networking system 130.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites 120 or any entity that can potentially access the information. The information that can be shared by a user comprises user profile information like profile photo, phone numbers associated with the user, user's connections, actions taken by the user such as adding a connection, changing user profile information and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, all external websites 120 or all external systems. One embodiment allows the specification of the set of entries comprise an enumeration of entities, for example, the user may provide a list of external websites 120 that are allowed to access certain information. Another embodiment allows the specification to comprise a set of entities along with exceptions that are not allowed to access the information. For example, a user may allow all external websites 120 to access the user's work information but specify a list of external websites 120 that are not allowed to access the work information. Certain embodiments call the list of exceptions that are not allowed to access certain information a block list. External systems, such as external websites 120, belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

For example, a user's privacy setting indicates that a first friend is allowed to access the user's work phone number and the user's mobile phone number while preventing the first friend from accessing other information about the user, such as the user's profile photo or the user's list of friends. However, the user's privacy setting indicates that a second friend is allowed to access the user's friend list. The information associated with a user includes actions taken by a user such as the action of adding a new friend 330. The user 130 can completely block another user or an application from accessing any information associated with the user 130. A user or an application that is blocked by the user 130 does not have access to any information associated with user 130.

The authorization server 235 contains logic to determine if certain information associated with a user can be accessed by a user's friends, external websites 120 and/or other applications and entities. For example, an external website 120 that attempts to access a user's comment about a URL associated with the external website 120 must get authorization from the authorization server 235 to access the user's work phone number. Based on the user's privacy settings, the authorization server 235 determines if another user, an external website 120, an application or another entity is allowed to access information associated with the user, including information about actions taken by the user. For example, the authorization server 235 uses a users privacy setting to determine if the user's comment about a URL associated with the external website 120 can be accessed by the external website 120. This enables a user's privacy setting to specify which other users, or other entities, are allowed to receive data about the user's actions or other data associated with the user.

Additionally, the social networking system 130 maintains data about objects with which a user may interact with using the social networking system 130. To maintain this data, the user profile store 240 and the connection store 245 store instances of the corresponding type of objects maintained by the social networking system 130. Each object type has information fields that are suitable for storing information appropriate to the type of object. For example, the user profile store 240 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

The connection store 245 includes data structures suitable for describing a user's connections to other users, connections to external websites 120 or connections to other entities. The connection stores 245 may also associate a connection type with a user's connections, which may be used in conjunction with the user's privacy setting, further described above, to regulate access to information about the user.

Data stored in the connection store 245, the user profile store 240 and the action log 230 allows the social networking system 120 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

For example, if a first user establishes a connection with a second user in the social networking system, user profiles of the first user and the second users from the user profile store 240 may act as nodes in the social graph. The connection between the first user and the second user stored by the connection store 245 is an edge between the nodes associated with the first user and the second user. Continuing this example, the second user man then send the first user a message within the social networking system 130, which is identified by the action logger 215 and stored in the action log 230. The stored action of sending the message is another edge between the two nodes in the social graph representing the first user and the second user. Additionally, the message itself may be identified from the action log 230 and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 240, where the attendance of the event is an edge between the nodes that may be retrieved from the action log 230. By generating and maintaining the social graph, the social networking system 130 includes data describing many different types of objects and the interactions and connections among those objects, providing a rich source of socially relevant information.

Structure and Content of a Web Page from an External Website

Figure 3:
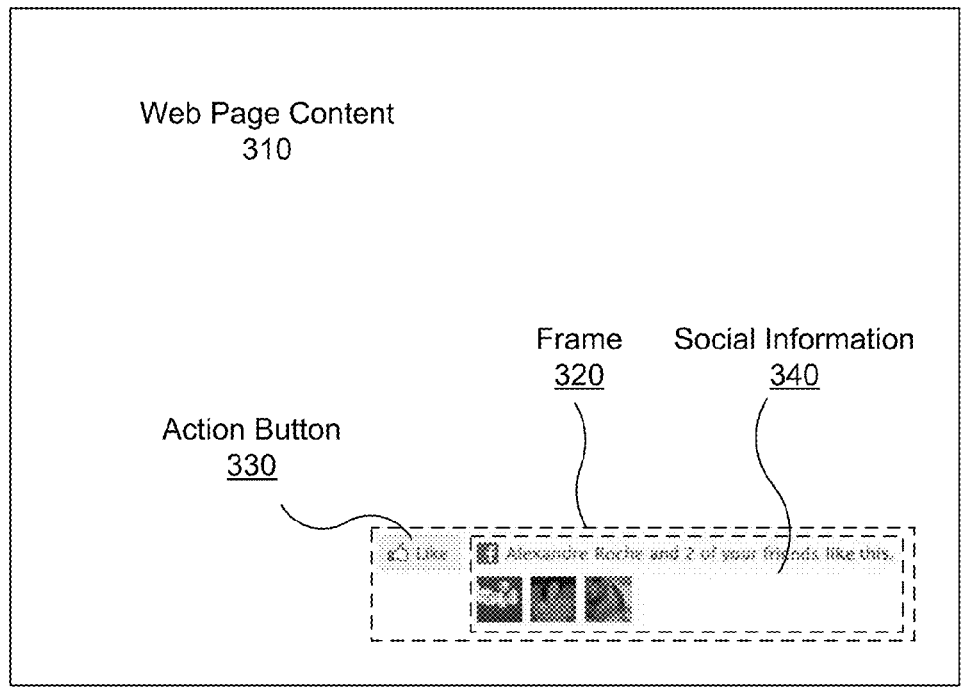
FIG. 3 is a web page of an external website that includes a frame for interacting with a node outside of the social networking system, in accordance with an embodiment of the invention.

FIG. 3 is one embodiment of a web page 122 of an external website 120. The web page 122 includes a frame 320 for interacting with a node in a social graph associated with the web page 122, which is outside of a social networking system 130 maintaining the social graph. The web page 122 includes content 310 such as text data, video data, image data or any other data for presentation using a browser application 122 operating on a user device 110. The web page 122 also includes one or more instructions describing formatting or presentation of the content 310. When a browser application 122 operating on a user device 110, executes the instructions included in the web page 122, the browser application 112 displays the identified content 310 using the format or presentation described by the web page 122.

In one embodiment, the web page 122 comprises a markup language document 116 that includes the content 310 and the instructions for formatting or presenting the content 310. In various embodiments, the markup language document 116 comprises a data file including extensible markup language (XML) data, extensible hypertext markup language (XHTML) data or other markup language data. In addition to the content 310 and instructions for formatting or presenting the content 310, the markup language document 116 comprising the web page 122 also includes one or more tags that include meta-information about a node in the social graph maintained by the social networking system associated with the web page 122. The tags may provide textual titles, labels, and/or descriptions about the node, as well as other information, such as a title, label, unique identifier, micro format, and/or descriptions about the node, as well as other information, such as the type of the node. The social networking system 130 retrieves the tags from the markup language document 116 and stores their information in connection with the node for the web page 122. The tags allow the social networking system 130 to create and define a node in a social graph based on the information contained within the web page 116. Because the web page 122 may be outside of a domain of the social networking system 130 and may be operated by an entity other than the social networking system 130 operator, the tags enable third parties to define, create, and maintain nodes that are then used by the social networking system 130.

Examples of information about the node provided by one or more tags included in the markup language document 116 encoding the web page 122 may include, without limitation, a title, label, unique identifier, micro format, and/or descriptions about the node, as well as other information, such as the type of the node, one or more social networking system user identifiers specifying one or more administrators of the node, and/or location information associated with the node. A title tag identifies a text string to be shown when the social networking system 130 or a widget 124 accesses the node. Similarly, a keyword tag includes text information identifying one or more keywords identifying the web page 122 and/or a description tag comprises text information describing the web page 122 that is displayed by the social networking system 122 or by a widget 124 when the node is presented. An image tag may identify an image displayed by the social networking system 122 or by a widget 124 when the node is presented. Additionally, a canonical tag identifies a canonical uniform resource locator (URL), or other web identifier, which identifies the web page 122.

An administrator tag includes one or more social networking system 130 user identifiers specifying users of the social networking system 130 with the ability to create and/or maintain nodes associated with the web page 122. The administrator tag potentially allows users outside of the social networking system 130 to create and maintain nodes used by the social networking system 130, effectively opening the social graph to third-party developers and encourages further development and definition of a complex and rich social graph. In one embodiment, the social networking system 130 provides a user interface to the user identifiers specified by the administrator tag, which facilitates modification of the node associated with the web page 122.

One or more microformat tags attach semantics to other markup tags included in the markup language document 116, which allows information identified by the markup tags to be automatically processed by the social networking system 130. The microformat tags allow data describing the node in the social networking system 130, or describing the object represented by the node in the social networking system 130, to be standardized. Additionally, one or more microformat tags may increase the information the social networking system 130 obtains from the web page 122 to more particularly identify a node type or to associate a type with a node. For example, the additional information obtained from the web page 122 using a microformat tag may allow the social networking system 130 to use data from the web page 122 to learn more about the interests of social networking system 130 users connected to the node associated with the web page 122. Similarly, a location tag provides information about a location associated with the web page 122 to the social networking system 130. For example, a location tag identifies one or more addresses associated with the web page 122.

A node type tag identifies a type of node created by the social networking website 130 and associated with the web page 122. As the social networking system 130 enables different actions to be performed on different types of nodes, the node type tag allows customization of how social networking system 130 users interact with the node associated with the web page 130. In one embodiment, the node type tag includes one or more values selected from a list maintained by the social networking system 130. For example, the node type tag may include a value identifying a user, a non-person entities, a content item, a group, an event, a message, a concept, a sports team, a blog, an activity, a web site, a movie, a musician, a hotel, a university, a government organization, a restaurant, a company, an landmark, a bar, a location or any other thing that can be represented by an object in the social networking system 130.

In one embodiment, multiple node type tags are included in the web page 122 or a node type tag includes multiple values, so that the social networking system 130 generates different types of nodes associated with the web page 122. For example, a web page 122 identifying a marathon may include node type tags identifying an event, a non-person entity and a location. This causes the social networking system 130 to generate three different nodes, a first node having an event type, a second node having a non-person entity type and a third node having a location type, each associated with the web page 122; the social networking system 130 enables users to perform different actions on each node, depending on the type of the node, as further described below. Alternatively, the social networking system 130 generates a single node having properties of different types of node. In the previous example, rather than generate a node having an event type, a node having a non-person entity type and a node having a location type, a single node is generated having the properties of a node having an event type, a node having a non-person entity type and a node having a location type is generated.

The web page 122 also includes a frame 320 that calls a Uniform Resource Locator (URL) within a domain associated with the social networking system 130. The frame 320 is rendered by a browser application 112 operating on a user device 110 executing a widget 124 included in the markup language document 116 encoding the web page 122. The widget 124 comprising one or more instructions that, when executed by a browser application 112, generate the frame 320 the frame within the web page 122 and include information from the social networking system in the frame 320.

In one embodiment, the frame 320 is an iframe including data obtained from the social networking system 130.

The frame 320 includes data from the social networking system 130 associated with a node maintained by the social networking system 130 and associated with a URL, or other web identifier, specified by the widget 124. For example, when a browser application 112 executes the widget 124, a request for content including a URL or other web identifier is communicated from the browser application 112 to the social networking system 130. The social networking system 130 identifies a node associated with the URL or other web identifier from the request for content and communicates information about the identified node to browser application 112, which displays the information in the frame 320. In one embodiment, the widget 124 communicates one or more parameters to the social networking system 130. The parameters allow the web page 124 to customize the frame 320. For example, the parameters specify the height and/or width of the frame 320.

In one embodiment, the frame 320 includes one or more action buttons 330, and may also include social information 340 from the social networking system 130, allowing a user to take a specific action with respect to the node associated with the content shown in the frame 320. The one or more action buttons 330 allow a user to take a specific action with respect to the node associated with the content shown in the frame 320. The specific action may depend upon the type of node associated with the content in the frame 320. For example, if the node has an event type, an action button 330 allows a user to indicate attendance to the event. If the node has an entity type, an action button 330 allows a user to indicate an interest in the entity. If the node has a location type, an action button 330 allows a user to check-in or otherwise indicate the user's presence at the location. Thus, an action button 330 allows a social networking system 130 user to perform one or more interactions with a node in the social networking system 130 presented by the frame 320.

The frame 320 may also include social information 340 obtained from the social networking system 130, allowing the content of the frame 320 to be personalized for an identified user of the social networking system 130. For example, the social information 330 may identify the number of friends of an identified user of the social networking system 130 who have taken an action associated with an action button 330 or may identify one or more specific friends of the identified user of the social networking system 130 who have taken an action associated with the action button 330. As an example, if the action button 330 allows a user to indicate an interest in an entity type node, the social information 340 may identify a number of friends of the user who have also indicated an interest in the entity type node. Further, if the action button 330 allows a user to indicate that the user will be attending an event associated with an event type node, the social information 340 may identify specific fiends of the user who have also indicated they will be attending the event. The social information 340 may be personalized to friends of an identified user or may be information obtained from all users if a user of the social networking system 130 is unable to be identified.

Figure 4:
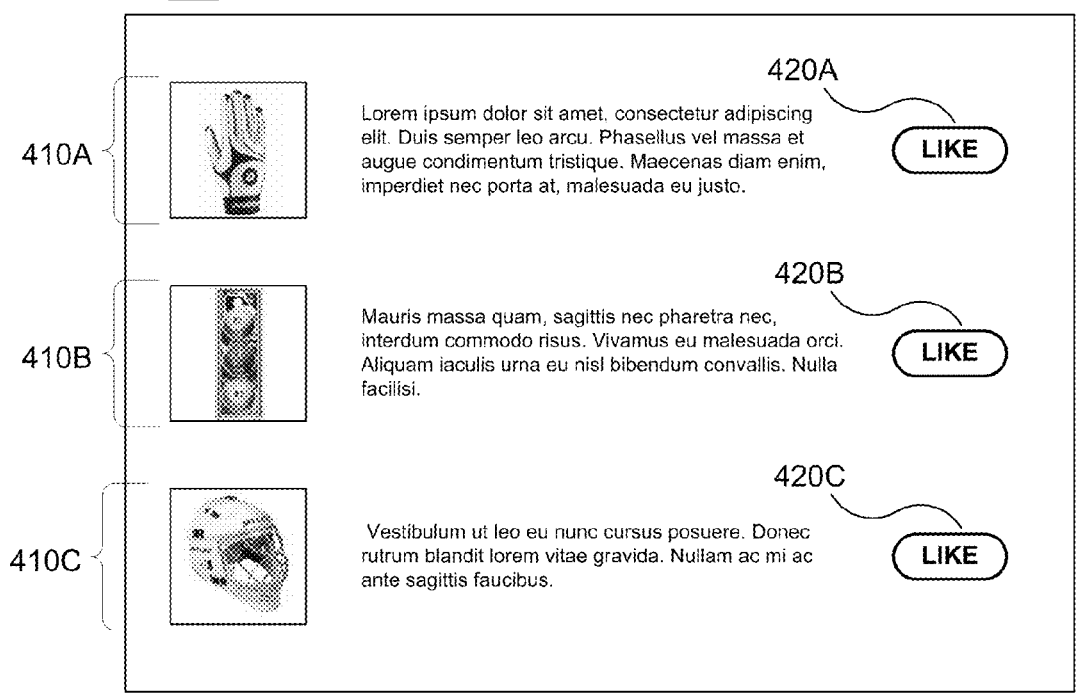
FIG. 4 is a web page of an external website including multiple frames for interacting with multiple nodes outside of the social networking system, in accordance with an embodiment of the invention.

FIG. 4 is a web page 400 of one embodiment of an external website 120 including multiple frames 410A, 410B, 410C for interacting with multiple nodes associated with the web page 400 outside of the social networking system. In one embodiment, the web page 400 includes content identifying multiple items, with each item associated with a node in the social graph of the social networking website 130. A frame 410A, 410B, 401C is displayed next to each item and including content from the social networking system 130 associated with the item.

For example, the web page 400 is maintained by an online retailer and displays links identifying multiple items for purchase from the online retailer. Each item for purchase is associated with a node in the social graph of the social networking system 130 and the web page 400 includes multiple widgets 124, each associated with an identified item for purchase. A widget associated with a first item communicates a first request for content including a URL or other web identifier of a web page associated with the first item to the social networking system 130. The request thus identifies a node associated with the URL or other web identifier of the web page associated with the first item and communicates information about the first node to browser application 112, which displays the information in the first frame 410A. Similarly, a second and third widget 124 communicate second and third requests for content, respectively, to the social networking system 124 identifying URLs of web pages associated with the second item and the third item, respectively. Content received from the social networking system 130 for a node associated with the second item and a node associated with the third item is then displayed in the second frame 410B and the third frame 410C, respectively. For example, the widget 124 associated with an item communicates a URL identifying product page within the online retailer to the social networking system 130.

The frames 410A, 410B, 410C may include one or more action buttons, allowing a user to interact with a node on the graph associated with the item displayed by the web page 400. For example, an online retailer may present frames 410A, 410B, 410C identifying different items for purchase, and an action button 420A, 420B, 420C in a frame 410A, 410B, 410C allows a user to comment on an item for purchase or to express an interest in an item.

As another example, the web page 400 is maintained by a movie review or a movie rental site that lists multiple movies and maintains a separate web page for each movie. The web page 400 may include links for accessing web pages associated with different movies with a frame 410A, 410B, 410C associated with each movie. The frames 410A, 410B, 410C are generated by different widgets 124 communicating URLs or web identifiers of different web pages associated with different movies to the social networking system 130. The frames 410A, 410B, 410C may each include more than one action button 420A, 420B, 420C, allowing a user to interact with a node in the social networking system 130 associated with a web page associated with a movie. For example, each frame 410A, 410B, 410C may include an action button 420A, 420B, 420C allowing a user to indicate an interest in the movie associated with a node in the social networking system 130.

In an additional example, the web page 400 is maintained by a restaurant reservation website and displays multiple open reservations. A frame 410A, 410B, 410C is proximate to each displayed reservation and includes content from the social networking system 130 associated with nodes in the social graph associated with web pages corresponding to the open reservations. An action button 420A, 420B, 420C allows a user to interact with the node associated with an open reservation. However, as discussed above in conjunction with FIG. 3, the action performed by an action button 420A, 420B, 420C depends on a node type. For example, if a first reservation is associated with a location node, interaction with a first action button 420A allows a user to check-in to indicate arrival at a location associated with the first reservation. If a second reservation is associated with an event node, interaction with a second action button 420B allows a user to indicate attending the event.

Interaction with a Node Associated with a Web Page Outside of a Social Networking System Initially, the social networking system 130 generates a node associated with a web page 122 outside of the social networking system 130. After the node is generated, the web page 122 is included in the social graph maintained by the social networking system 130, effectively opening the social graph to third-party developers and encouraging further development and definition of a complex and rich social graph.

An operator of an external website 120 creates a markup language document 116 encoding a web page 122 that includes the widget 124 described above in conjunction with FIG. 1. The markup language document 116 may also include one or more tags as described above in conjunction with FIG. 3. The social networking system 130 requests and receives the markup language document 116 encoding the web page and extracts and records information from tags in the markup language document 116. The information extracted from the tags is used by the social networking system 130 to create a new node and the information extracted from the tags is stored in the social networking system 130. For example, the social networking system 130 generates a node having a type identified by a node type tag and store data extracted from a title tag, a keywords tag, a description tag and an administrator tag included in the markup language document. If the markup language document 116 does not include any tags, the social networking system 130 may generate a predetermined type of node and parse the markup language document 116 to identify data for storage in the generated node.

The social networking system 130 may request the markup language document 116 encoding the web page 122 in response to various types of events. For example, an operator of the web page 122 or of an external website 120 including the web page 122 communicates a request to the social networking system 130 to generate a node associated with the web page 122. For example, a user interface in the social networking system 130 may receive a request to generate a node associated with a web page. Alternatively, the social networking system 130 requests the markup language document 116 encoding the web page 122 when the web page 122 is initially loaded by a browser 112 and the social networking system 130 receives a request for content when the browser 112 executes the widget 124 included in the web page 122. As another example, in response to receiving an initial interaction with an action button within the frame generated by the widget 124, the social networking system 130 requests the markup language document 116 encoding the web page 122 if the social networking system 130 determines that a node associated with the web page 122 does not currently exist.

Figure 5:
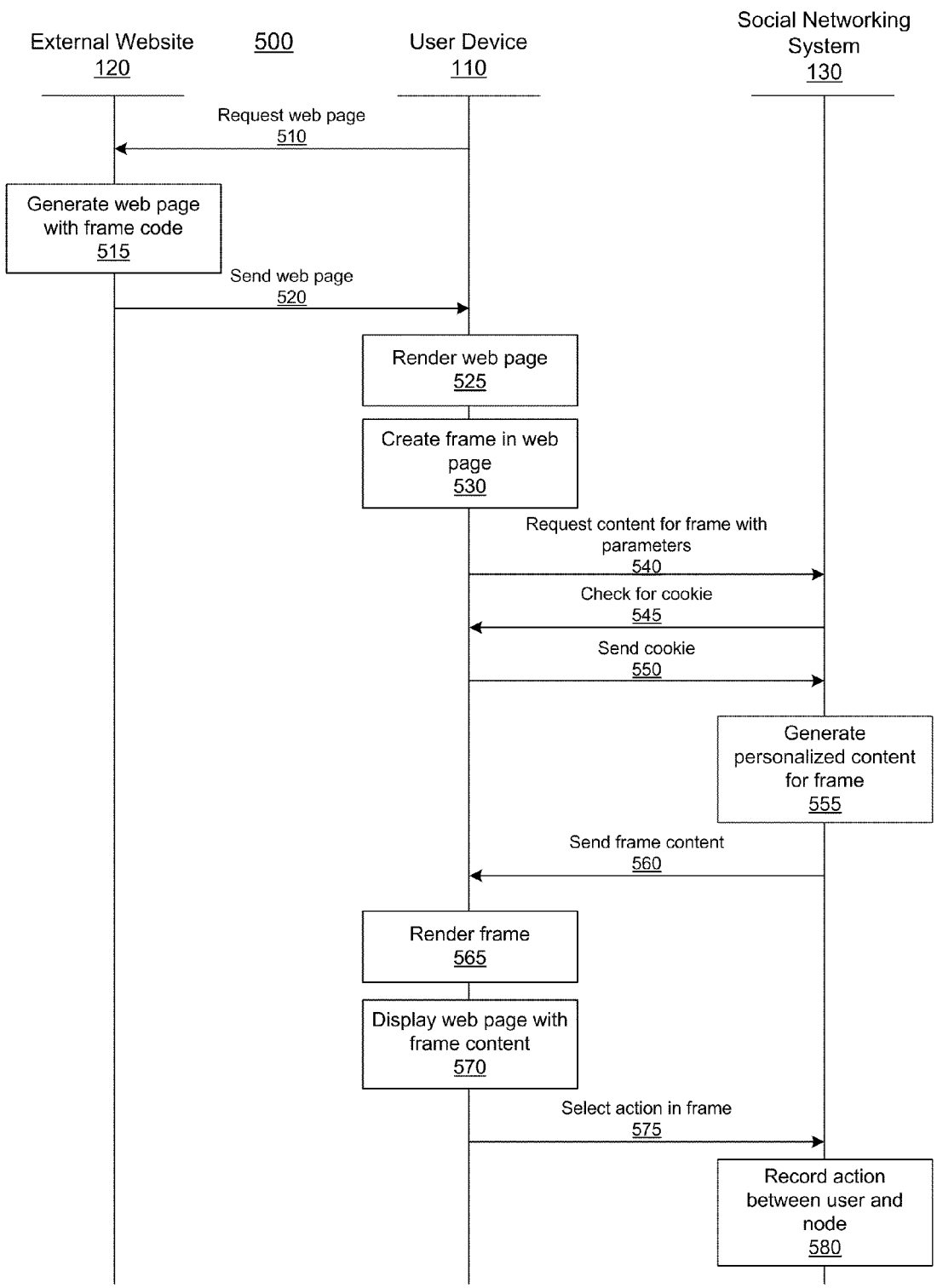
FIG. 5 is an interaction diagram of a process for interacting with a node outside of a social networking system, in accordance with an embodiment of the invention.

Once the social networking system 130 stores a node associated with a web page 122, a user of the social networking system 130 may interact with the node by interacting with the web page 122. FIG. 5 is an interaction diagram of a process 500 for interacting with a node outside of a social networking system 130, in accordance with an embodiment of the invention. In the embodiment shown by FIG. 5, the external website 120 is separate from the social networking system 130. Initially, a user device 110 requests 510 a web page 122 from the external website 120. For example, a user of the user device 110 enters a uniform resource locator (URL) or other identifier associated with the web page 122 into a browser application 112 operating on the user device 110. The browser application 112 identifies the external website 120 associated with the received URL or other identifier and requests 510 a web page 122 associated with the received URL or other identifier from the identified external website 120.

After receiving the request for the web page 122, the external website 120 generates the requested web page 122 using locally-stored data. For example, the external website 120 generates 515 a markup language document 116 describing the content and formatting of the web page 122 based on stored data. The external website 120 includes a widget 124 comprising instructions that, when executed by a browser application 112 of a user device 110, retrieve data from the social networking system 130 and display the information retrieved from the social networking system 130. For example, the widget 124 comprises an instruction associated with the social networking system 130 that generates a frame within the web page 122 that includes information from the social networking system 130. Hence, the widget 124 allows a web page 122 from the external website 120 to provide personalized content from the social networking website 130 when the web page 122 is rendered and displayed by a browser application 112 of a user device 110. The widget 124 also allows a user to interact with content from the social networking website 130 by interacting with content in the frame generated within the web page 122. The widget 124 includes a uniform resource locator (URL), or other web page identifier, associated with the web page 122 from the external website 120, and may also include one or more parameters describing presentation of the frame, or iframe, by the browser 112 of the user device 110. In one embodiment, the URL included in the widget 124 is the same as the URL of the requested web page 122. Alternatively, the URL included in the widget 124 is a URL associated with a web page other than the requested web page 122.

The external website 120 then sends 520 the markup language document 116 describing the generated web page 122 and including the widget 124 to the user device 110 through the network 140. After receiving the markup language document 116, the browser 112 renders 525 the web page 122 based on the content and formatting instructions included in the markup language document 116. In addition to rendering 525 the web page 122, the browser 112 in the user device 110 executes the widget 124 to create 530 a frame in the web page 122. Execution of the widget 124 also causes the browser 112 to request 540 content from the social networking system 130 for inclusion in the frame via the network 140. The URL, or other web identifier, included in the widget 124 is communicated to the social networking system 130 to request 540 content from a node associated with the URL included in the widget 124. In one embodiment, the browser 112 also identifies one or more parameters from the widget 124 and transmits the identified parameters to the social networking system 130 when requesting 540 content for inclusion in the frame to allow further customization of the requested content.

Responsive to receiving the request for content from the browser 112, the social networking system 130 checks 545 the user device 110 for a cookie 114. In response to the social networking system 130 checking 545 for the cookie 114, the user device 110 sends 550 the cookie 114, or a message associated with the cookie 114, to the social networking system 130. In one embodiment, the existence of cookie 114 indicates whether the user of the computing device 110 is a user of the social networking system 130 (e.g., whether the user has a valid account with the social networking system 130). If the user of the computing device 110 is a user of the social networking system 130, the cookie 114 may contain information indicating whether the user is logged into the social networking system 130 (e.g., whether the user has a current valid session with the social networking system 130). Checking 545 the user device 110 for a cookie 114 thus allows the social networking system 130 to authenticate the user session. In other embodiments, the social networking system 130 may just determine whether the user is a user of the social networking system 130, e.g., by checking 545 for an existence of a cookie, without determining whether the user is logged into the social networking system 130. Although cookies are described herein for authenticating the user and/or the user session, any other methods of user or session identification or authentication may be used (such as recognizing a physical token).

If the user associated with the received cookie 114 has been authenticated, the social networking system 130 generates 555 content for inclusion in the frame that is personalized according to the user associated with the received cookie 114. For example, the social networking system 130 generates 555 social information describing actions a node associated with the URL included in the widget 124 and associated with friends of the identified user. For example, the generated social information identifies a number of friends of the identified user taking a specific type of action regarding the node or identifies specific friends of a user recently taking a specified type of action regarding the node. Alternatively, the social networking system 130 generates 555 content by extracting data from the node associated with the URL included in the widget 124 without adding social information associated with the identified user. For example, the social networking system 130 determines a title, a description and an image from the node. Additionally, the social networking system 130 generates one or more action buttons for inclusion in the frame. The one or more action buttons are dependent on the node type, as described above in conjunction with FIGS. 3 and 4, and allow a user to interact with the node associated with the URL included in the widget 124 by interacting with the one or more action buttons.

If the social networking system 130 determines that the user associated with the received cookie 114 matches an administrator user identifier stored in the node associated with the URL included in the widget 124, the social networking system 130 generates 550 administration content for presentation by the frame. An administrator tag included in the markup language document 114 encoding a web page 122 specifies users of the social networking system 130 with the ability to create and/or maintain nodes associated with the web page 122. Hence, when the social networking system 130 identifies a user associated with an administrator user identifier, the social networking system 130 generates 555 content allowing the user to modify the node associated with the URL included in the widget 124. For example, the social networking system 130 generates 555 a link that directs the user to a debug page when accessed by the user via the frame. Alternatively, the social networking system 130 generates 555 debugging information from the node associated with the URL included in the widget 124 for display using the frame. For example the social networking system 130 identifies tags missing from the markup language document 116 encoding the web page 122 and allows the user to enter the missing tags or to modify existing tags.

However, if the social networking system 130 is unable to authenticate the user associated with the received cookie 114, the social networking system 130 communicates a prompt for the user to enter authentication information to the user device 110. Alternatively, the social networking system 130 generates 555 content by extracting data from the node associated with the URL included in the widget 124 without adding social information. In another embodiment, the social networking system 130 generates 555 content by extracting data from the node associated with the URL included in the widget 124 and determining actions taken by any user of the social networking system 130 regarding the identified node. For example, the social networking system 130 may identify the most recent actions regarding the identified node taken by any user of the social networking system 130. Thus, until the social networking system 130 receives authentication information associated with the user associated with the received cookie 114, the content generated 555 by the social networking system 130 does not include social information describing actions performed by friends of the user associated with the received cookie 114 regarding the identified node. After receiving and verifying authentication information associated with the user associated with the cookie 114, the social networking system 130 may generate 555 social information for inclusion in the frame that is personalized for the user associated with the cookie 116, as described above.

Similarly, if the user device 110 does not send 550 a cookie 114 to the social networking system 130, generates 555 content for inclusion in the frame by extracting information from the URL included in the widget 124. In one embodiment, the generated content may also include one or more actions taken by any user of the social networking system 130 and associated with the node associated with URL included in the widget 124. In one embodiment, the social networking system 130 also includes a prompt for joining the social networking system 130 in the frame.

The social networking system 130 then sends 560 the frame content to the user device 110 through the network 140. The browser application 112 included on the user device 110 then renders 565 using the frame using the content received from the social networking system 130 and displays 570 the web page 122 and the frame, with the content from the social networking system 130 displayed in the frame. The frame includes one or more action buttons generated by the social networking system 130.

When an action is selected 575 by a user of the user device 110 interacting with an action button, the selected action is transmitted to the social networking system 130 via the network 140. Selecting 575 an action by interacting with an action button allows users to interact with the node associated with the URL identified by the widget 124 as if the user were communicating within the node from within the social networking system 130. The external website 120 need not know that the action was taken, or even the identity of the user. The social networking system 130 then records 580 the action between the user and the node associated with the URL identified by the widget 124, allowing the social networking system 130 to react as if the user were interacting with the node from within the social networking system 130. Thus, by interacting with the node associated with the URL identified by the widget 124 using an action button 330 in the frame 320, the action taken by the user is equivalent to any other user interaction with the node from within the social networking system 130. As with any user interaction with another node in the social networking system 130, this interaction may create an edge between the user and the node that the user interacted with. The stored edge provides useful contextual information about the connection between that node and the user (where the user is also represented by a node).

In one embodiment, the action button or other user interact enabling the user to interact with the node may be on a portion of the web page that is within the third-party web page's domain, rather than within the frame. In such an embodiment, the third-party website 120 may need to communicate this action to the social networking system 130 so that the action can be recorded. In such an embodiment, the social networking system 130 may provide one or more APIs, which the third-party website 120 may use to send communications such as these to the social networking system 130. Alternatively, any other appropriate mechanisms for communicating this information from the third-party website 120 to the social networking system 130 may be used.

In addition to recording 580 the action between the user and the node, the social networking system 130 may take additional actions dependent on the type of action. For example, if the action selected 575 in the frame is the user expressing an interest in the node, the action is recorded 580 by the social networking system 130 and may be published to a feed associated with the user and the user's profile may be updated to include the affiliation between the user and the node. As another example, if the action selected 575 in the frame is the user indicating that the user is at a location, the action may be published to a feed describing actions taken by the user and communicated to friends of the user. Further, if the action selected 575 in the frame is the user indicating attendance to an event, the action is recorded 580, and may also be added to a user's calendar and published to a feed describing actions taken by the user.

Additionally, after recording 580 the selected action, the social networking system 130 may allow an entity associated with the node associated with the URL identified by the widget 124 to publish communications back to users who have performed an action relative to the node associated with the URL identified by the widget 124. For example, if a user indicates an interest in the node associated with the URL identified by the widget 124, an administrator of the URL identified by the widget may publish communications back to the user via the social networking system 130. Further, the social networking system may communicate a message to the user via the frame to confirm that the selected action was taken by the social networking system 130 or communicate a message to the user via the frame to authorize the social networking system 130 to notify friends of the user that the action was taken.

Accordingly, the social graph maintained by the social networking system 130 may include anything that can be represented by a web page. In addition to increasing the amount of data stored by the social graph, this allows users of the social networking system 130 to easily interact with nodes in the social graph while outside of a domain associated with the social networking system 130. For example, a user may interact with a node of the social graph associated with a web page 122 from an external website 120 while viewing the web page 122 retrieved from the external website 120. Interactions between users and nodes representing web pages may be propagated back to the social networking system 130, which may then use socially relevant data from the interaction for various purposes (e.g., posting activity feeds, targeting advertising, etc.).

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    accessing information from one or more tags in a web page by a social networking system, the web page being associated with a domain that is different from a domain associated with the social networking system;
    creating a node in the social networking system, the created node defined at least in part based on the accessed information;

maintaining the node in the social networking system and connections between the node and one or more additional nodes maintained by the social networking system;

receiving requests from a user of the social networking system to perform an action related to the node; and storing information related to the user's action related to the node by the social networking system.

2. The method of claim 1, further comprising:
communicating the user's action related to the node in a stream directed to one or more other users of the social networking system with whom the user has established a connection.

3. The method of claim 1, further comprising:
updating an affinity between a user and a node for the user who performed the action related to the node.

4. The method of claim 1, further comprising:
updating a profile of the user who performed the action related to the node to reflect that the user has performed the action.

5. The method of claim 1, further comprising:
updating stored information about the node to reflect that the user has performed the action related to the node.

6. The method of claim 1, wherein the node in the social networking system represents a page of content in the social networking system.

7. The method of claim 6, wherein the action comprises a user's expressing an interest in the page.

8. The method of claim 7, further comprising:
response to a user's expressing an interest in the page associated with the node, updating a profile of the user with the expressed interest.

9. The method of claim 1, wherein the node in the social networking system represents an event.

10. The method of claim 9, wherein the action comprises a user's confirming attendance at the event.

11. The method of claim 1, wherein the node in the social networking system represents a location.

12. The method of claim 11, wherein the action comprises a user's confirming the user's presence at the location.

13. The method of claim 1, wherein accessing the information from the web page comprises:
obtaining a markup language document for the web page; and
identifying one or more tags in the markup language document, the tags containing the accessed information.

14. The method of claim 13, wherein the one or more tags comprise at least one information item selected from a group consisting of: a type of the node, a name of the node, a textual description associated with the node, location information associated with the node, and a unique identifier for the node, an identity of one or more users of the social networking system designated as an administrator of the node.

15. The method of claim 1, wherein the accessed information comprises a definition of a type of the node, and wherein the method further comprises limiting the one or more actions that a user can perform related to the node based on the type of the node.

16. The method of claim 1, wherein the accessed information comprises a textual description associated with the node, and wherein the method further comprises displaying the textual description at the social networking system in connection with the node.

17. The method of claim 1, wherein the accessed information comprises an identity of one or more users of the social networking system designated as an administrator of the node, and wherein the method further comprises providing an interface enabling the one or more users designated as administrators for the node to update the information about the node stored by the social networking system.

18. The method of claim 1, wherein the creating is responsive to receiving from a user device a request associated with the web page and determining that a node associated with the web page does not exist.

19. A method comprising:
receiving at a server of a social networking system a request for information based on an instruction in a markup language document, wherein the request for information is responsive to a request for a web page of a third-party website that is within a domain of the third-party website that is different from a domain of the social networking system, and wherein the markup language document includes an instruction to create a frame within the web page that includes information obtained from the social networking system;
determining that a node associated with the web page of the third-party website does not exist in the social networking system;
accessing information from one or more tags in the web page by the social networking system;
creating a new node in the social networking system, the created node defined at least in part based on the accessed information;
determining the requested information, the information for enabling a user to interact with a node in the social networking system;
sending the information for display in the frame of the web page;
receiving a request to interacted with the node by the user; and
storing the interaction at the social networking system.

20. The method of claim 19, wherein the node is associated with the web page.

21. The method of claim 19, wherein the frame comprises an iframe that contains a web page in the domain of the social networking system.

22. The method of claim 21, wherein the iframe includes an action button for performing an action related to the node directly within the domain of the social networking system.

23. The method of claim 19, further comprising:
sending for display on the user device information about one or more other users who have interacted with the node and with whom the user has established a connection within the social networking system.

* * * * *